United States Patent
Nakashima et al.

[11] Patent Number: 5,829,779
[45] Date of Patent: Nov. 3, 1998

[54] SIDE PROTECTING AIR BAG

[75] Inventors: Mariko Nakashima, Inazawa; Michio Inoue, Kagamigahara; Nobuhiko Sakamoto, Inazawa, all of Japan

[73] Assignee: Toyoda Gosei Co., Ltd., Aichi-ken, Japan

[21] Appl. No.: 825,466

[22] Filed: Mar. 28, 1997

[30] Foreign Application Priority Data

| Mar. 28, 1996 | [JP] | Japan | 8-074715 |
| Jun. 20, 1996 | [JP] | Japan | 8-159819 |

[51] Int. Cl.⁶ ............................................. B60R 21/22
[52] U.S. Cl. ................................. 280/730.2; 280/729
[58] Field of Search ........................... 280/730.2, 729, 280/743.1, 730.1

[56] References Cited

U.S. PATENT DOCUMENTS

| 5,454,595 | 10/1995 | Olson et al. | 280/743.1 |
| 5,524,924 | 6/1996 | Steffens, Jr. et al. | 280/730.2 |
| 5,536,038 | 7/1996 | Bollaert et al. | 280/730.2 |
| 5,556,128 | 9/1996 | Sinnhuber et al. | 280/730.2 |
| 5,570,900 | 11/1996 | Brown | 280/729 |
| 5,647,609 | 7/1997 | Spencer et al. | 280/730.2 |
| 5,692,774 | 12/1997 | Acker et al. | 280/729 |

FOREIGN PATENT DOCUMENTS

| 2109637 | 9/1972 | Germany | 280/729 |
| 542262 | 2/1993 | Japan | 280/730.2 |
| 6227349 | 2/1993 | Japan | 280/730.2 |

*Primary Examiner*—Chirstopher P. Ellis
*Attorney, Agent, or Firm*—Cushman Darby & Cushman, IP Group of Pillsbury Madison & Sutro LLP

[57] ABSTRACT

A side protecting air bag comprising a body and an extension portion that are formed together into a bag shape. The body includes a mounting portion on the peripheral edge for mounting the air bag and is shaped to extend generally at a right angle from the mounting portion. The extension is formed so as to merge into the body along the mounting portion. When the air bag is folded, the extension is inserted into the body so that the body accommodating the extension is folded together with the extension onto the mounting portion.

4 Claims, 8 Drawing Sheets

Fig. 6A
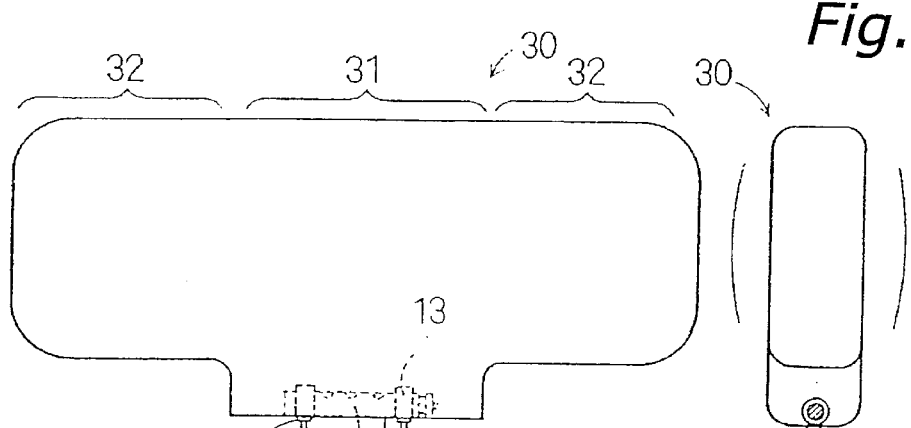
Fig. 6E
Fig. 6B
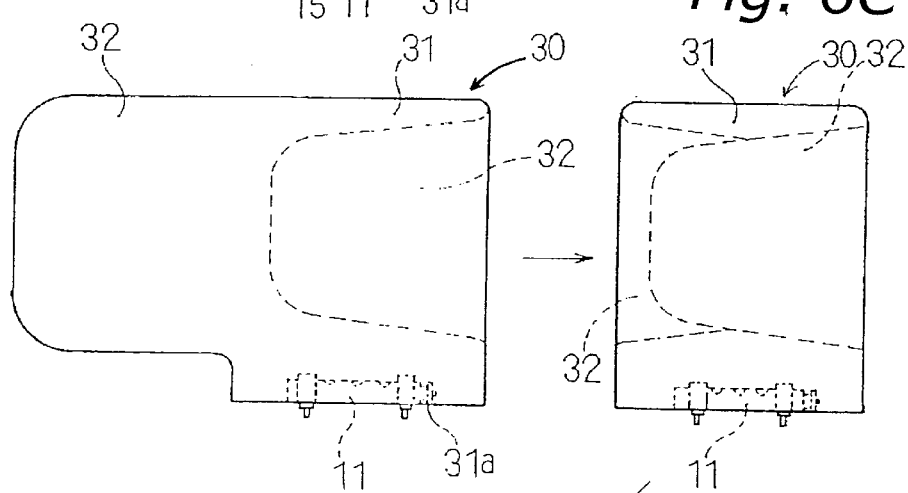
Fig. 6C
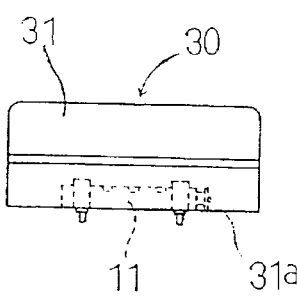
Fig. 6D
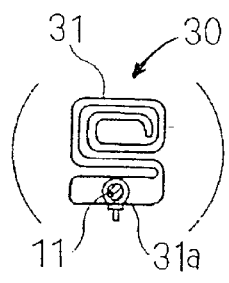
Fig. 6F

SIDE PROTECTING AIR BAG

BACKGROUND OF THE INVENTION (1) Field of the Invention

The present invention relates to an air bag for protection from side collisions of a vehicle and, more particularly, to a side protection air bag arranged between the inner wall of the vehicle and the driver.

(2) Related Art

In the prior art, side protection air bags have been made with a thin square shape when inflated. Such a side would be mounted at one end of its inflated shape to a case or the like. On the other hand, such a side protecting air bag has been folded in the vicinity of the mounting portion in a bellows shape.

Moreover, the air bag is inflated when the inflating gas enters the bag and when inflated, the air bag protrudes from its folded shape generally at a right angle with respect to the mounting portion. The inflating gas is supplied by an inflator, of a cylinder type or the like, that is arranged in the vicinity of the mounting portion.

The side protecting air bag of the prior art can be inflated over a wide number of shapes along the mounting portion in the following manner. Specifically, the inflated shape of the bag body can protrude generally at a right angle from the mounting and also include an extension extending from the bag body generally parallel with the mounting portion.

However, the presence of the added extension in parallel with the mounting portion to the bag body can cause the following problem. Specifically, if the side protecting air bag is constructed by the ordinary folding method using a bellows shape, the time period for completing the expansion of the extension and also the body itself will be lengthened. This is because the expansion of the body is not completed before the extension completes its expansion. As a result, increased time is required for the expansion of the body for it to become fully elongated.

SUMMARY OF THE INVENTION

In order to solve the above-specified problem, therefore, an object of the present invention is to provide a side protecting air bag which can complete the expansion of the body quickly even if an extension merges into the body in parallel with a mounting portion.

The above-specified object can be achieved by a side protecting air bag comprising a body and an extension formed together into a bag shape, wherein the body includes a mounting portion for mounting the air bag on a peripheral edge and is shaped to extend generally at a right angle from said mounting portion. An extension is formed to merge into the body along the mounting portion, and wherein when said air bag is to be folded, the extension is inserted into the body so that the body accommodating the extension is folded together with the extension onto the mounting portion.

In the side protecting air bag according to the present invention, at the time of expanding, the bag body completes its expansion before the bag extension is hardly inflated. As the internal pressure of the body rises, the extension then protrudes from the body until its expansion is completed.

As a result, in the side protection air bag according to the present invention, the bag body can be quickly brought into completed expanded state even if the bag extension parallel to the mounting portion merges into the bag body. Moreover, the desired portion of the passenger is reliably restricted and protected by the bag body, and another portion of the passenger is then properly restrained and protected by the bag extension which has completed its expansion after the expansion of the body.

When the bag extension has a vent hole, the inflating gas will not flow out till the bag body completes its expansion. Thus, a loss in inflating gas is less than in a construction where the vent hole is formed in the bag body.

As a result, the capacity of the inflator can be reduced for inflating the air bag. Also, the time period for the expansion can be further shortened.

Moreover, the following merit can be achieved not by the construction, in which the bag body has the vent hole, but by the construction in which the bag extension has the vent hole. Specifically, if the bag body is sandwiched between the passenger and the door during the expansion of the air bag, the pressure in the bag extension will easily rise. This makes it possible to improve the protecting performance of the bag extension.

Other objects, features, and characteristics of the invention will become apparent upon consideration of the following description and the appended claims with reference to the accompanying drawings, all of which form a part of this specification and wherein like reference numerals represent corresponding parts in the various views.

BRIEF DESCRIPTION OF THE DRAWINGS

FIGS. 6A–6F illustrate the steps of folding another embodiment of the present invention with FIG. 6E being an end view of FIG. 6A and FIG. 6F being an end view of FIG. 6D;

DESCRIPTION OF THE PREFERRED EMBODIMENTS

The present invention will be described in connection with its embodiments with reference to the accompanying drawings. It should be understood that the present invention is not limited to the disclosed embodiments and that various modifications, changes or equivalents of the components are included in the scope of the claims.

Figure 1:
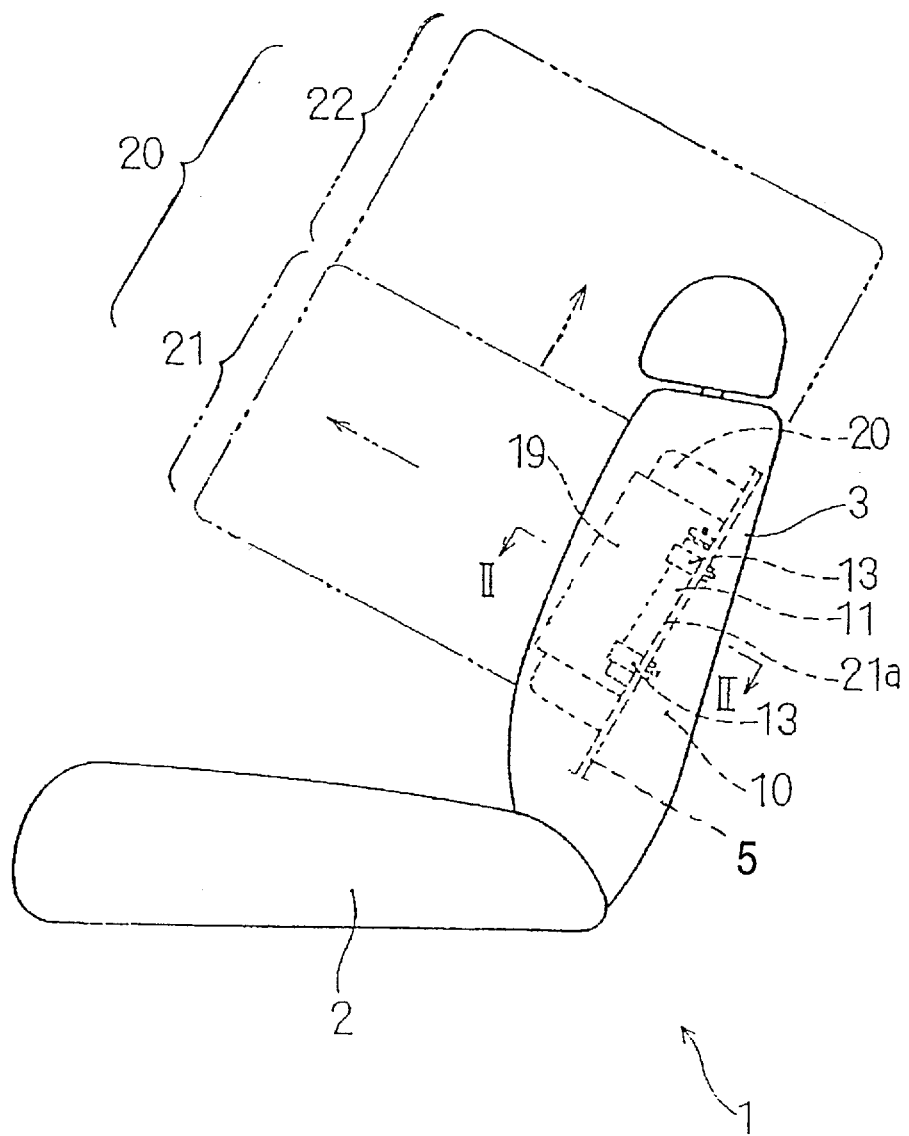
FIG. 1 is a side elevation showing a mode of operation in which an air bag according to one embodiment of the present invention is used.
Figure 2:
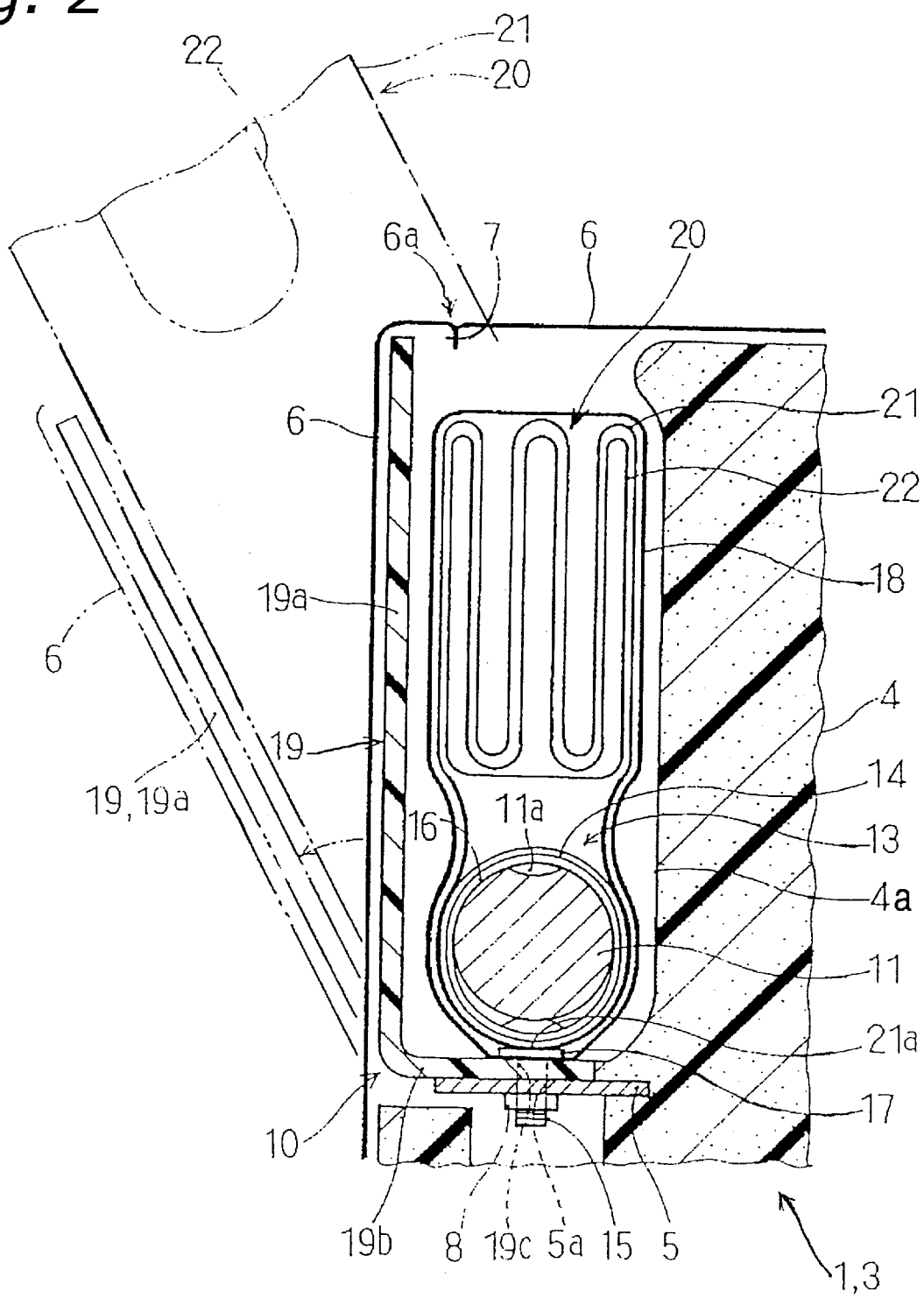
FIG. 2 is an enlarged section taken along line II—II of FIG. 1.
Figure 3:
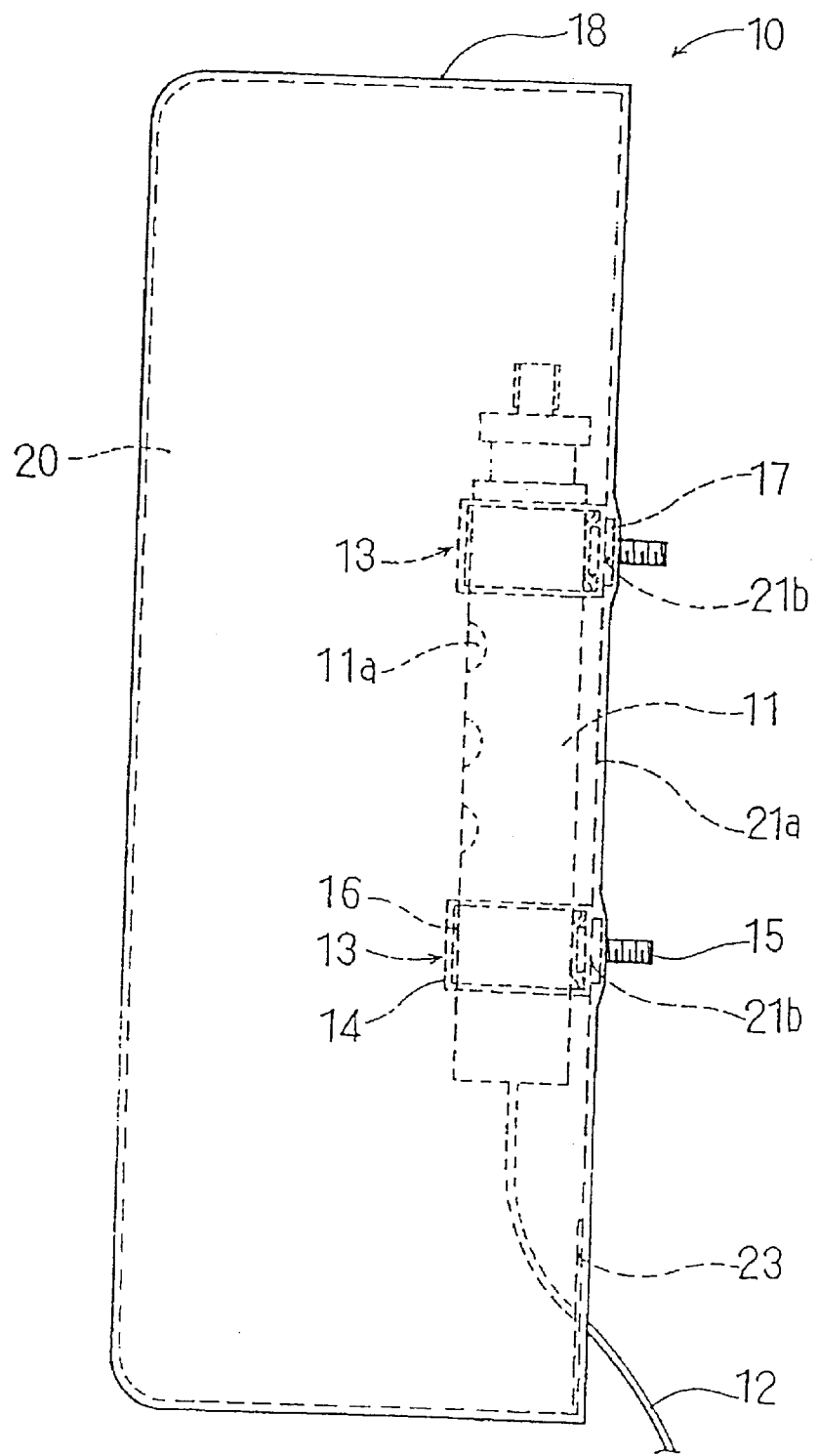
FIG. 3 is a side elevation of the same embodiment.

An air bag 20 of one embodiment is used in a side protecting air bag device 10, as shown in FIGS. 1, 2 and 3. This air bag device 10 is arranged at the left-hand side of a seat back 3 of a seat 1 located adjacent the side door of a vehicle. This seat 1 is constructed to include a vehicle seat bottom 2 and the seat back 3.

The seat back 3 is equipped with a back body 4 made of urethane or the like. This back body 4 has an accommodating recess 4a which is so formed in a portion at the left-hand side of the seat back 3 as to extend generally vertically. On the face of the accommodating recess 4a, as located at the rear side of the vehicle, there is arranged a frame 5 that extends generally vertically so that its upper end is closer to the rear portion of the seat back 3 and its lower end is closer to the front portion of the seat back 3. The frame 5 is equipped with mounting holes 5a at two predetermined portions. On the outer surface of the seat back 3, on the other hand, there is arranged a seat cover 6 made of ornamental cloth or the like. Seams 6a are formed in the seat cover 6 at a portion, as located at the front side of the accommodating recess 4a. These seams 6a are so formed by sewing the cut end portions of the seat cover 6 with a sewing thread 7 that the seat cover 6 may be easily broken when the air bag 20 is inflated.

The air bag device 10 is constructed to include an inflator 11, the air bag 20 and a bag cover 19.

The inflator 11 is cylindrical having a plurality of gas discharge ports 11a in its circumference. The inflator 11 is arranged on a mounting portion 21a, as located at the rear side in the air bag 20. To the lower terminal of the inflator 11, there is connected a lead wire 12 for inputting a signal for actuating inflation and thereby producing inflating gas. This lead wire 12 is threaded through a vent hole 23 of the air bag 20 and connected with a connector (not-shown) which is connected with a conventional air bag operating circuit.

To the inflator 11, there are fixed two upper and lower mounting brackets 13. Each mounting bracket 13 is made of cylindrical sheet metal and equipped with a sleeve 14 and a cushioning member 16. To the sleeve 14, there is welded a bolt 15 which protrudes radially therefrom. The cushioning member 16 is fixed on the inner circumference of the sleeve 14. This sleeve 14 is given an internal diameter larger than that of the external diameter of the inflator 11. These mounting brackets 13 are mounted and fixed on the inflator 11 in the following manner. First, the sleeve 14 is mounted through the cushioning member 16 on the inflator 11. Next, the sleeve 14 is so partially caulked as to be radially reduced, and each bracket 13 is fixed on the inflator 11.

The bolt 15 of each mounting bracket 13 thus fixed on the inflator 11 is threaded through a mounting hole 21b (as shown in FIG. 3) of the air bag 20. The bolt 15 is further threaded into the mounting hole 5a of the frame 5 through a spring nut 17 and a bracket 19b of the cover 19. The bolt 15 thus threaded is fastened by a nut 8 so that the air bag device 10 is fixed in the seat back 3.

The cover 19 is made of a synthetic resin and composed of a cover body 19a and the bracket 19b. The cover body 19a is formed into a rectangular sheet covering 10 the side of the seat back body 4. The bracket 19b is bent at a right angle from the end portion of the cover body 19a. The bracket 19b has two mounting holes 19c for receiving the bolts 15 individually.

Figure 4A:
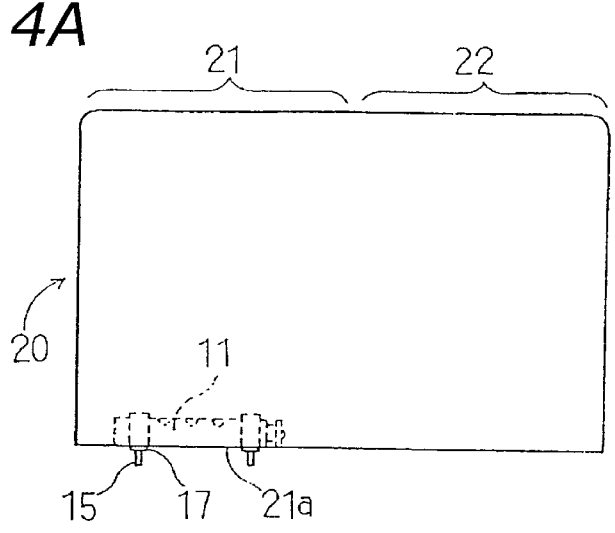
FIGS. 4A–4F show sequential steps illustrating the folding of the air bag.

The air bag 20 has a generally rectangular thin shape when inflated, as illustrated by double-dotted lines in FIGS. 1 and 2 in FIG. 4A. In a portion of the peripheral edge of the rear end side of the air bag 20, there is arranged the inflator 11, as indicated at the mounting portion 21a. The air bag 20 is constructed to include a bag body 21 and a bag extension 22. The bag body 21 extends generally at a right angle outwardly from the mounting portion 21a. The bag extension 22 extends generally in parallel with and outwardly from the bag body 21 relative to the mounting portion 21a.

This mounting portion 21a of the bag body 21 is provided with the mounting holes 21b (as shown in FIG. 3) each for receiving the bolt 15 of each mounting bracket 13. The mounting portion 21a is further provided with the slit-shaped vent hole 23 (as shown in FIG. 3).

The bag extension 22 has a capacity substantially equal to that of the bag body 21 in the present embodiment. Moreover, the bag extension 22 is formed into such a bag shape as is symmetric to the bag body 21 excepting the mounting holes 21b and the vent hole 23.

The air bag 20 is manufactured in the following manner. First of all, the mounting holes 21b and the vent hole 23 are formed at the center of a cloth material 20a which is made of one sheet of generally rectangular woven cloth of polyester or polyamide. Next, the cloth material 20a is folded in two along its center where the mounting holes 21b are located and so as to overlap its two ends. The overlapping peripheral edges are sewn to each other into a bag. This bag can be turned inside out to manufacture the air bag 20 by making use of the portion of the vent hole 23.

Incidentally, this air bag 20 may be manufactured by preparing two sheets of cloth material having a generally rectangular shape. Specifically, these two sheets may be sewn to each other along their peripheral edges, and the resultant back may be turned inside out. In this modification, the mounting holes 21b and the vent hole 23 are formed by interrupting the cloth sewing at the corresponding portions.

The folding method of this air bag 20 can then occur as follows. First, the inflator 11 having the mounting brackets 13 fixed thereto is inserted in advance from the vent hole 23 into the air bag 20, as illustrated in FIG. 4A. At this point, the bolts 15 of the individual mounting brackets 13 protrude from the mounting holes 21b. Moreover, the spring nuts 17 are fitted on the individual bolts 15 to retain the circumferential edges of the individual mounting holes 21b.

Figure 4D:
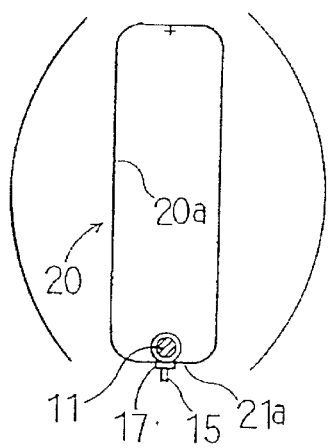
Figure 4B:
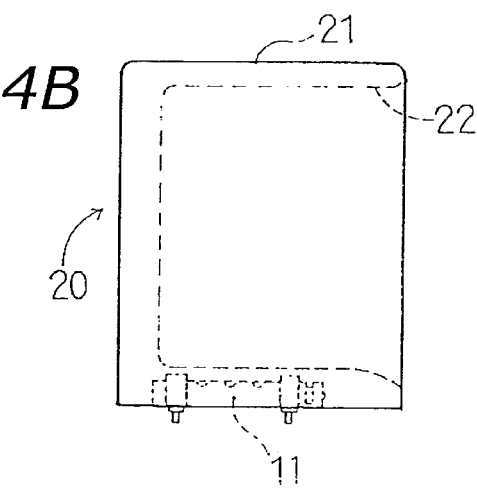

Next, the bag extension 22 is inserted into the bag body 21, as illustrated in FIGS. 4B and 4D.

Figure 4E:
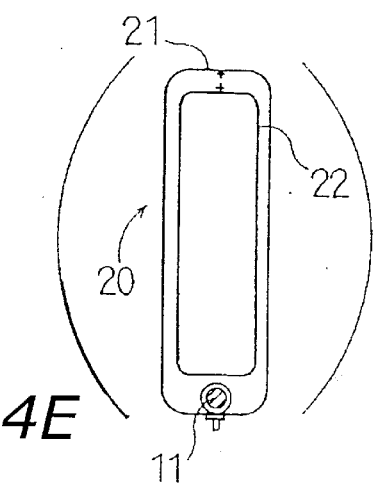
Figure 4C:
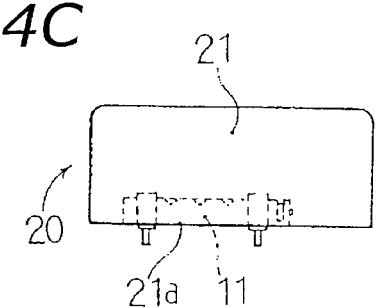
Figure 4F:
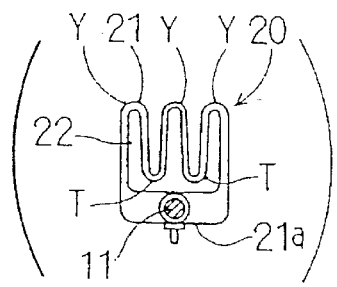

After this, the bag body 21 containing the bag extension 22 is corrugated (or folded in a cactus shape) onto the mounting portion 21a together with the bag extension 22, as illustrated in FIGS. 4E and 4F. Thus, the folding operations of the air bag 20 can be completed.

FIG. 2 and FIG. 4C show the folding of one stage so as to simplify the illustration. As a matter of fact, however, a plurality of stages are formed in accordance with the folded capacity. For example, two stages of the corrugated type folding are formed to produce five creases Y and four interior folds T while individually adding two folds.

In order to prevent unfolding, moreover, the folded air bag 20 of the embodiment is desirably covered with a thin film 18, shown in FIG. 2, of a breakable thermally shrinking film or the like. In this modification, the bolts 15 of the individual mounting brackets 13 are protruded from the film 18.

Then, the bolt 15 of each mounting bracket 13 is inserted into each mounting hole 19c of the bracket 19c and each mounting hole 5a of the frame 5 and is fastened by nuts 8. In this way, the air bag device 10 having the air bag 20, the inflator 11 and the bag cover 19 can be attached to the frame 5.

After the air bag device 10 is thus attached to the frame 5, the seat back body 4 is sheathed with the seat cover 6. Then, the seat 1, thus completed, is mounted on the vehicle, and the terminal of the lead wire 12 is connected to a predetermined connector so that the air bag device 10 can be operatively installed on the vehicle.

After the seat 1 has been mounted on the vehicle, the air bag device 10 of the embodiment is operated if the electric signal for actuating the inflator 11 via the lead wire 12, which in turn produces inflation gases to be generated. In short, the inflator 11 discharges the gas from the gas discharge ports 11a. Then, the air bag 20 is largely inflated toward the front while breaking the film 18 and the seams 6a of the seat cover 6 and opening the body 19a of the cover 19.

In the air bag 20 of the embodiment, the bag extension 22 is accommodated in the bag body 21 so that the body 22 is folded in the corrugated shape together with the extension 22 onto the mounting portion 21a. At the time of inflating, the bag body 21 completes its expansion with the bag extension 22 being hardly inflated, as illustrated by double-dotted lines in FIGS. 1 and 2. As the internal pressure of the bag body 21 rises, moreover, the bag extension 22 is inflated out of the bag body 21 until its expansion is completed, as illustrated by triple-dotted lines in FIG. 1.

In the side protecting air bag 20 of the embodiment, therefore, the bag body 21 can be quickly expanded even if the bag extension 22 parallel to the mounting portion 21a merges into the bag body 21. As a result, the predetermined portion (e.g., the breast) of the passenger is reliably restricted by the bag body 21, and another portion (e.g., the head or the breast when the waist is restricted by the bag body 21) of the passenger can then be reliably restricted by the bag extension 22 which will have completed its expansion after the end of expansion of the bag body 21.

Figure 5A:
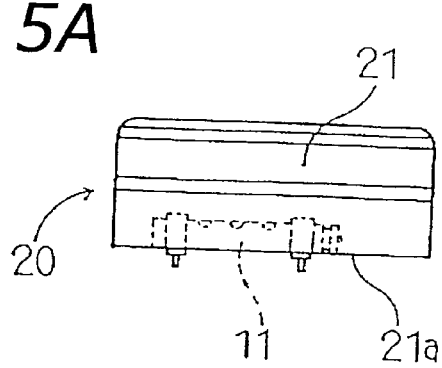
FIGS. 5A and 5B illustrate another method of folding a bag body having a bag extension accommodated according to the same embodiment with FIG. 5B being an end view of FIG. 5A.
Figure 5B:
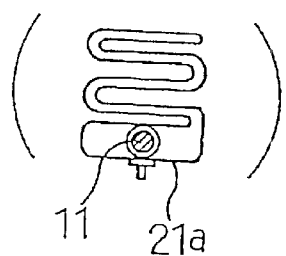

This embodiment has been exemplified by a construction in which the bag body 21, which accommodates the bag extension 22, is folded in the corrugated shape onto the mounting portion 21a. As illustrated in FIGS. 5A and 5B, however, the bag body 21 accommodating the bag extension 22 may be folded in a bellows shape onto the mounting portion 21a. As another alternative to corrugative and bellows folding, the bag body 21 may be rolled, as illustrated in FIG. 6D.

Moreover, the embodiment has been exemplified by a construction in which one extension 22 of the air bag 20 merges into the bag body 21. In a modified air bag 30 illustrated in FIGS. 6A and 6F, however, several bag extensions 32 may be constructed to merge into the two sides of a bag body 31.

The folding method of this construction still have the inflator 1, with mounting brackets 13 fixed thereon, inserted in advance, as in FIG. 4A, into the air bag 30 from the vent hole (although not designated), as illustrated from the side in FIG. 6A and from the end in FIG. 6E. The bolt 15 of each mounting bracket 13 continues to protrude from the mounting hole (although not shown) formed in a mounting portion 31a. On each bolt 15, moreover, there is fitted a spring nut 17 to retain the circumferential edge of each mounting hole.

Next, the bag extensions 32 are sequentially inserted into the bag body 31, as illustrated in FIGS. 6B and 6C.

As illustrated in FIGS. 6D and 6F, moreover, the bag body 31 accommodating the bag extensions 32 and 32 may be rolled and folded onto the mounting portion 31a.

Moreover, the air bag 20 of the first embodiment has been exemplified by a construction in which the bag extensions 22 leading from the bag body 21 are given generally the same shape as that of the body 21 and arranged in symmetry. However, the bag extensions 32 may be formed, as illustrated in FIG. 6A, into a shape having a smaller capacity than that of the bag body 21, or a shape in which the mounting portion 21a is omitted from the bag body 21.

The individual embodiments described above have been exemplified by a construction in which the inflator 11 is inserted and arranged in the air bags 20 and 30. However, gas inlet ports may be formed at the side of the mounting portions 21a and 31a so that the inflator may be arranged outside of the air bags 20 and 30. In this modification, the circumferential edges of the gas inlet ports provide the mounting portions 21a and 31a of the air bags 20 and 30, as provided with a plurality of mounting holes. Moreover, those mounting portions 21a and 31a may be fastened by bolts or rivets to the frame 5 of the seat 1 or the case of the predetermined side protecting air bag device.

Figure 7A:
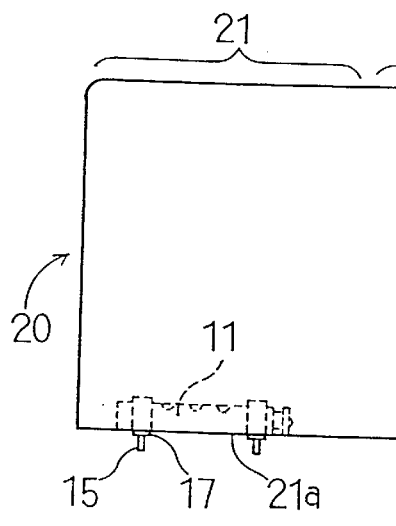
FIGS. 7A and 7B are side elevation and an end view, respectively, showing an air bag, when inflated, according to still another embodiment of the present invention.
Figure 7B:
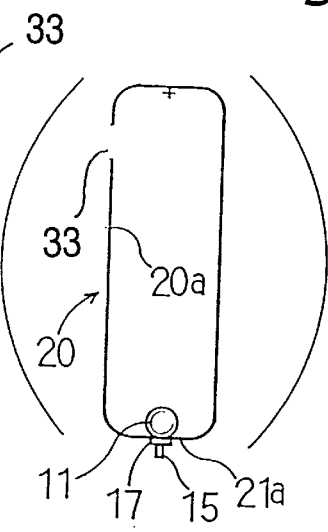
Figure 8A:
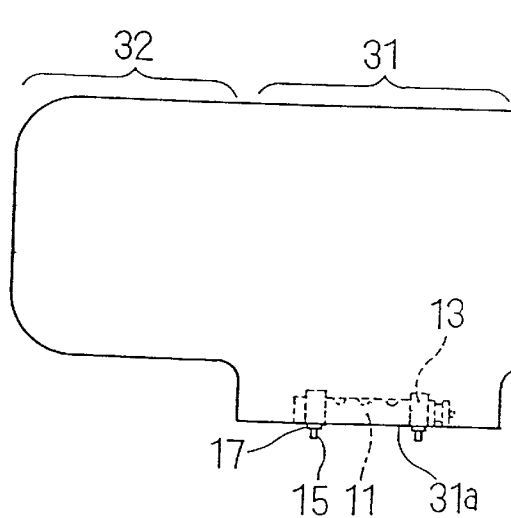
FIGS. 8A and 8B are side elevation and an end view, respectively, showing an air bag, when inflated, according to a further embodiment of the present invention.
Figure 8B:
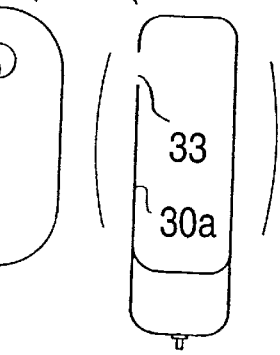
Figure 9:
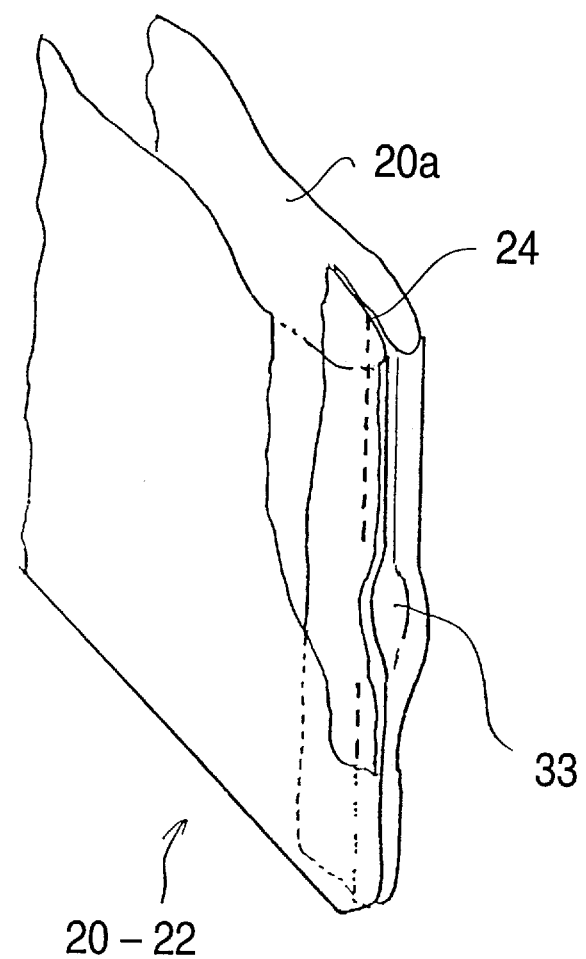
FIG. 9 is a diagrammatic perspective view showing an air bag, when inflated, according to a further embodiment of the present invention and a vent hole in a sewn seam.

On the other hand, the vent hole may be formed not in the bag body itself but rather in the bag extension. Specifically, the cloth materials 20a and 30a for the extensions 22 and 32 of the air bags 20 and 30 may be formed, as shown in FIGS. 7 and 8, in the form of a vent hole 33. When the cloth material 20a for manufacturing the air bag 20 is to be sewn, as shown in FIG. 9, a portion of the edge seam can include a partial interruption in the sewing thread 24 thereby forming the vent hole 33.

The following operations are achieved from the construction described above. Specifically, the bag extensions 22 and 32 are inserted, when folded, into the bag bodies 21 and 31, the vent hole 33 is closed with the inner periphery of the bodies 21 and 31. In other words, the air bags 20 and 30 having the vent hole 33 are given the structure of a self-sealed valve mechanism. With this structure, the inflatable gas will not flow out before the bag extensions 22 and 32 begin to expand. In other words, the inflating gas will not flow out of the air bags 20 and 30 till the end of the expansions of the bag bodies 21 and 31. This structure reduces the loss of the inflating gas. As a result, the inflator 11 may have a small capacity. Moreover, it is possible to shorten the time period in which the air bags 20 and 30 expand. Further, the structure, in which the bag extensions 22 and 32 have the vent hole 33, has the following merit over the structure in which the bag bodies 21 and 31 have the vent hole. Specifically, when the bag bodies 21 and 31 are sandwiched between the passenger and the door while the air bags 20 and 30 are expanding, the pressure in the bag extensions 22 and 32 rises easily. This makes it possible to improve the protecting performance of the bag extensions 22 and 32.

The diameter of the vent hole is usually set to about 10 to 30 mm. In the shown example, there are disclosed the air bags 20 and 30 which have one vent hole. However, the air bags may have a plurality of vent holes at spaced apart positions.

What is claimed is:

1. A side protecting air bag for use with an air bag device disposed in a seat back of a vehicle, said side protecting air bag comprising:

a body and an extension thereof formed together into a bag shape, said body including a mounting portion positioned on a peripheral edge thereof such that said mounting portion is disposed generally in a vertical direction when said mounting portion is disposed on the air bag device, said body being shaped to extend generally at a right angle away from said mounting portion, said extension is formed to merge into said body when said air bag is folded, said extension is inserted into said body and folded together with said body toward said mounting portion such that a length of the air bag as measured from a front to a rear of the vehicle is shortened, wherein, upon deployment of said air bag, said body of the air bag first expands towards the front of the vehicle and then said extension expands substantially vertically.

2. A side protecting air bag according to claim 1, wherein said extension includes a vent hole.

3. A side protecting air bag according to claim 2, wherein a cloth material for forming said extension includes an opening to define said vent hole.

4. A side protecting air bag according to claim 2, wherein said extension is formed by sewing a cloth material and said vent hole is formed by an interruption in such sewing.

* * * * *